March 25, 1930.    J. GLISCH    1,751,809
FRICTION CLUTCH
Filed May 28, 1927
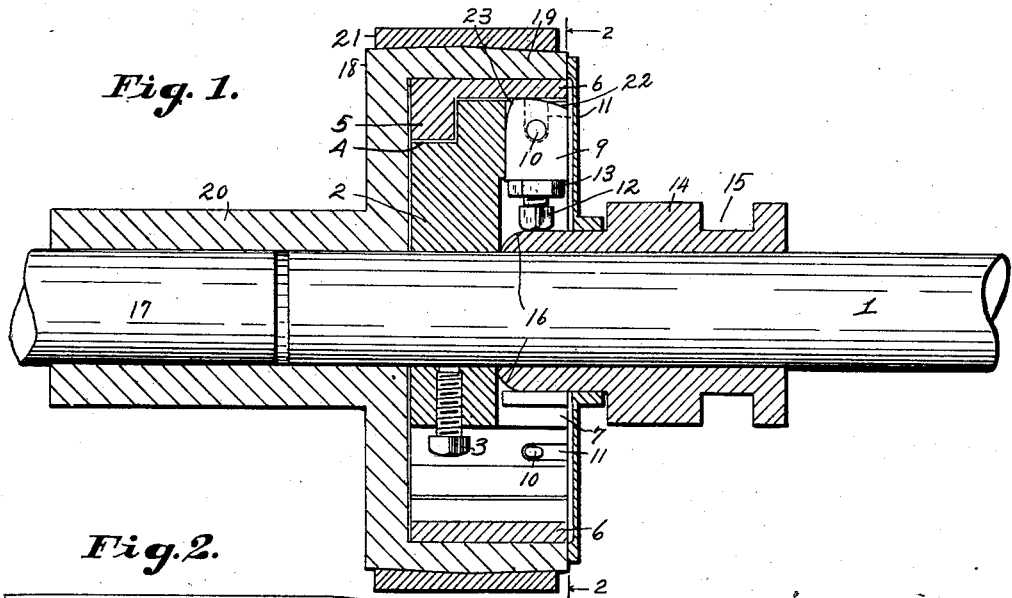
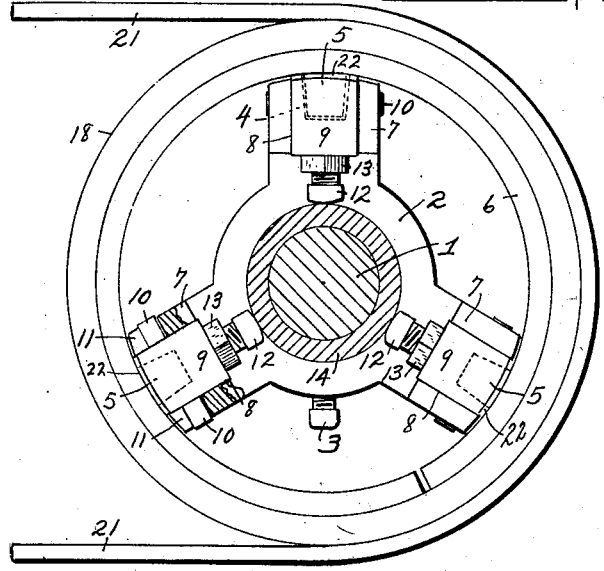
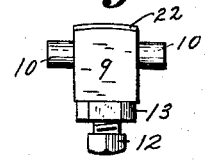
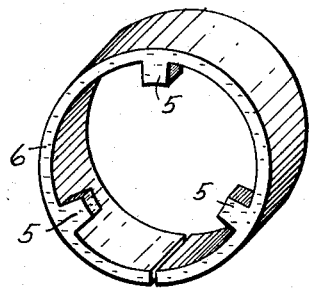
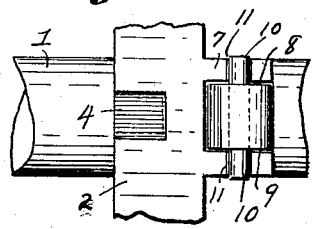
INVENTOR.
John F. Glisch
BY Erwin, Wheeler & Woolard
ATTORNEY.

Patented Mar. 25, 1930

1,751,809

UNITED STATES PATENT OFFICE

JOHN F. GLISCH, OF MILWAUKEE, WISCONSIN

FRICTION CLUTCH

Application filed May 28, 1927. Serial No. 194,933.

My invention relates to improvements in friction clutches with particular reference to clutches of that type in which a clutch ring is expanded within a ring or rim for gripping purposes and released for contraction under its own resilient tension to its normal diameter.

It has been well known practice in the manufacture of clutches to provide an arm, or a plurality of arms, the ends of which are covered with friction material, said arms being so designed as to be radially extensible for friction engagement with opposing parts of the clutch mechanism. It has also been general practice to provide a cone shaped collar slidable on the shaft for thrusting these arms radially into engagement. In such mechanisms when the clutch is released, the power required heretofore to slide the cone out of engagement with the arms has been enormous and in many cases prohibitive. This difficulty is disengaging clutches of this general character is generally due to the positioning of the various parts "over center" and in a position which substantially locks the parts against retraction.

The primary object of my invention is to provide a clutch of the above mentioned type with means for utilizing the principle of the wedge for expanding or clutch setting purposes, and the principle of the lever for releasing purposes whereby the reliability of a cone expander acting upon radial arms or dogs may be combined with the ease of release characteristic of lever mechanisms.

A further object of my invention is to provide a clutch setting oscillatory dog which is adapted for substantially a line contact with the actuated clutch member, the line of contact being substantially parallel to the axis about which the dog oscillates and the dog being oscillated by an actuating member movable along a line transverse to said axis which holds the dog in unstable equilibrium against the associated clutch member when in clutch setting position whereby the initial retractive movement of the actuator instantly tilts the dog and displaces it from its position of line contact with said clutch member.

It is a further object of my invention to provide a clutch which will be safely operable both by reason of the absence of projections which might catch the clothing of the operator and by reason of the ease and positiveness of its release due to the shape and structure of the expanding and contracting mechanism of my device.

In the drawings:

Figure 1 is a longitudinal axial section of my clutch mechanism.

Figure 2 is a front view of the actuating mechanism of my clutch on a section through line 2—2 of Figure 1 and showing a portion of one of the arms cut away to exhibit the mounting of one of the dogs.

Figure 3 is a detail view of one of the dogs.

Figure 4 is an isometric view of the split friction ring which forms part of my device.

Figure 5 is a radial view of one of the arms of my clutch spider showing the mounting of the dog.

Like parts are identified by the same reference characters throughout the several views.

Mounted upon the driven shaft 1, I have provided an armed spider 2, which is secured to this shaft in any suitable manner. In the drawings, I have shown it secured to the shaft 1 by means of a set screw 3. Each of the arms is recessed at 4 to provide anchorage for the lugs 5 which extend radially inwardly from the annular split friction ring or clutch member 6, which is adapted to encompass the entire driven mechanism. The members thus far described will, therefore, rotate as a unit by reason of the engagement of these lugs 5 in the recesses of the spider arms.

Each of the spider arms has axial extensions 7 spaced from the shaft 1, and each of these extensions is channeled at 8 to form a radially extending path for the limited reciprocation of dogs or eccentrics 9. Each of these dogs or levers is provided with fulcrum trunnions 10 which are journaled loosely in the open grooves 11 formed in the sides of the channels. An adjustment screw 12 with a lock nut 13 is provided for each of the dogs 9, as shown in Figure 3, and each of the dogs is mounted in the grooves 11 with its adjustment screw adjacent the shaft which forms the support or mounting for the parts thus far described. A clutch control cone or eccentric actuator 14, which comprises a wedge slidably mounted on the shaft 1, is provided with a shifter groove 15 and a curved face 16 which, when the cone is forced along the shaft, is thrust against the heads of the adjustment screws 12, thereby to force the dogs or eccentrics 9 outwardly against the split ring 6.

The parts thus far described may constitute the driven elements of the clutch mechanism. The driving elements comprise a shaft 17 and a pulley 18 which is provided with an axial annular flange 19 and a hub 20. The usual form of belt drive, as shown at 21, may, of course, be substituted by a gear drive if the face of the axial flange 19 is cut to provide teeth in the usual form of gear construction.

The shape of the lever dogs 9 is important in the operation of my device. The face of each of the dogs 9 is curved and cut away to form an eccentric shoulder or lobe, as shown at 22, and the rear outwardly projecting corner is cut away to form a curved face 23. By mounting these dogs, as shown in the drawings, I have provided for expansion of the split friction ring as follows:

The engagement of the clutch is accomplished by axial thrusts of the cone 14 with its curved face 16 under each of the adjustment screws 12 in such manner that the dogs or eccentrics 9 are first forced inwardly about trunnions 10 to the radial alignment indicated in Fig. 1 and then moved bodily radially outwardly in their channel mountings, as permitted by the formation of the trunnions and their guideways. The split ring is thereby expanded to engage the inner face of the flange 19 of the driving pulley, and motion is thereby transmitted from the driving pulley through the split ring which, by means of its lugs 5 in the recesses 4 of the spider arms, drives the connecting shaft 1.

Release of a clutch, which has been in operation and which has heretofore presented difficult problems by reason of the usual locking of the parts in their engaged position, is easily accomplished in my new device in the following manner:

When the cone 14 is retracted from the clutch mechanism, the initial axial movement thereof draws with it frictionally the set screws 12 which force the pivoting of the dogs 9 as levers upon their trunnions 10. This initial movement immediately relieves the split friction ring 6 from pressure by the dogs for the curved faces 22 will be instantly retracted from the ring 6, and the clutch will be released. Usual locking of the clutch in engagement is thus overcome. It will be found that clutches embodying my improved construction require very little power for their release.

I have formed my split ring of soft iron, but it will be readily understood that the face of the split ring may be covered with friction material in any one of the several ways now common in the building of clutches.

As will be apparent from Figures 1 and 5, the surfaces or faces of the spider 2 between the arms or axial extensions 7 act as stops for the dogs 9 limiting the extent of the oscillatory movement of the dogs in the direction of their engagement with ring 6.

I claim:

1. The combination with clutch members having opposed friction surfaces, of driving connections carrying one of said members, driven connections carrying the opposed member, a channel member providing a slotted guideway, a reciprocable block provided with pivot pins receivable in said slots, said block having a curved working face adapted, in one position, to engage one of said members, and means for forcing the block along the guideway into said position, said block being adapted to bodily retract, and to simultaneously oscillate away from the engaged member.

2. In a clutch, the combination with a driving member and a driven member, of a friction ring adjacent to and frictionally engageable with the driving member and mounted for rotation with the driven member, a radial arm extending toward the friction ring from the driven member, said radial arm being carried by the driven member, a dog eccentrically and pivotally mounted on the radial arm, and a wedge adapted to adjust the dog to present its longer radius against the ring and to move it bodily into pressure engagement therewith.

3. The combination with rotatable concentric members, of an interposed dog mounted for radial movement into contact with the outer of said members and also connected with the inner member for rotation therewith; said dog being adapted to tilt, in a direction to instantly release its engagement with the outer of said members, and means for adjusting said dog radially and engageable with the latter for tilting movement thereof.

4. An expanding clutch including a set of radially movable dogs having outer faces eccentric in axial planes, said dogs being tiltable in said planes and adapted to present their eccentric faces at a decreased radius when tilted in one direction, and an expander adapted to adjust said dogs radially with their longer radii presented for clutch setting operation, and to tilt the dogs to present their shorter radii to the work when the expander moves retractively.

5. An expanding clutch including opposed friction members and radially movable dogs provided with trunnions, a spider providing journals supporting said trunnions and providing channels within which said dogs are radially reciprocable, a stop limiting pivotal movement of the dogs on the trunnions in one direction, and an expander adapted to force the dogs outwardly radially in engagement of the clutch and to swing the dogs on their trunnions in release thereof.

6. In a clutch the combination with a clutch member movable radially of the clutch, of an eccentric movable radially independently of and engageable with said member, and an eccentric actuator arranged, when said clutch is rendered operative, to first place the eccentric with its lobe in its axially relative position of operativeness and to then move said eccentric radially, whereby to cause said member to move radially, said actuator being arranged also, when said clutch is rendered inoperative, to rotate said eccentric for release of said member.

JOHN F. GLISCH.